United States Patent
Touloumtzis (10) Patent No.: US 10,031,586 B2
(45) Date of Patent: Jul. 24, 2018

(54) MOTION-BASED GESTURES FOR A COMPUTING DEVICE

(71) Applicant: Amazon Technologies, Inc., Reno, NV (US)

(72) Inventor: Michael P. Touloumtzis, Brookline, MA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 72 days.

(21) Appl. No.: 13/916,464

(22) Filed: Jun. 12, 2013

(65) Prior Publication Data

US 2014/0368441 A1 Dec. 18, 2014

(51) Int. Cl.
| | | |
|---|---|---|
| *G06F 3/041* | (2006.01) | |
| *G06F 3/01* | (2006.01) | |
| *G06F 3/0487* | (2013.01) | |
| *G06F 1/16* | (2006.01) | |
| *G06F 3/0488* | (2013.01) | |

(52) U.S. Cl.
CPC ............ *G06F 3/017* (2013.01); *G06F 1/1626* (2013.01); *G06F 3/0487* (2013.01); *G06F 3/04883* (2013.01); *G06F 2200/1637* (2013.01)

(58) Field of Classification Search
CPC .. G06F 3/04883; G06F 3/0488; G06F 3/0416; G06F 3/017; G06F 2203/04808; G06F 2203/04104; G06F 2203/04106; G06F 3/04845; G06F 2200/1637; G06F 3/0346; G06F 2200/1614
USPC ......................................................... 345/173
See application file for complete search history.

(56) References Cited

U.S. PATENT DOCUMENTS

| | | | | |
|---|---|---|---|---|
| 7,469,381 B2* | 12/2008 | Ording | ........................... | 715/702 |
| 7,663,607 B2* | 2/2010 | Hotelling | .............. | G06F 3/0416 |
| | | | | 345/173 |
| 7,688,306 B2* | 3/2010 | Wehrenberg | .......... | G06F 1/1616 |
| | | | | 345/156 |
| 7,978,182 B2* | 7/2011 | Ording et al. | ................. | 345/173 |
| 8,130,211 B2* | 3/2012 | Abernathy | .......... | G06F 3/04883 |
| | | | | 345/156 |
| 8,245,156 B2* | 8/2012 | Mouilleseaux | ..... | G06F 3/04883 |
| | | | | 715/834 |
| 8,269,842 B2* | 9/2012 | Wang | ...................... | G06F 3/017 |
| | | | | 348/208.12 |
| 8,305,355 B2* | 11/2012 | Matas | ................... | G06F 3/0485 |
| | | | | 345/156 |
| 8,365,090 B2* | 1/2013 | Ording | ......................... | 715/784 |

(Continued)

OTHER PUBLICATIONS

Gary Barrett and Ryomei Omote, Projected-Capacitive Touch Technology, SID 2010, pp. 16-21.*

(Continued)

*Primary Examiner* — Michael J Jansen, II
(74) *Attorney, Agent, or Firm* — Polsinelli LLP (57) ABSTRACT

Approaches to enable a computing device, such as a phone or tablet computer, to use sensor information obtained from sensors of the computing device to interpret one or more gestures and/or other input provided by the user. In particular, the computing device may use information about the movement of the device gathered from an accelerometer or gyroscope in combination with input data detected by the touch screen or cameras of the device in order to disambiguate between several different types of gestures for the device.

12 Claims, 7 Drawing Sheets

(56) References Cited

U.S. PATENT DOCUMENTS

| | | | | |
|---|---|---|---|---|
| 8,793,621 B2* | 7/2014 | Boillot | G06F 3/0346 | |
| | | | 715/863 | |
| 8,854,325 B2* | 10/2014 | Byrd | G06F 3/04883 | |
| | | | 178/18.01 | |
| 8,878,821 B2* | 11/2014 | Robinson | G06F 3/0425 | |
| | | | 345/174 | |
| 8,902,181 B2* | 12/2014 | Hinckley | G06F 3/0487 | |
| | | | 345/173 | |
| 8,904,312 B2* | 12/2014 | Boillot | G06F 3/011 | |
| | | | 715/863 | |
| 9,170,708 B2* | 10/2015 | Chaudhri | G06F 3/04817 | |
| 9,244,533 B2* | 1/2016 | Friend | A63F 13/06 | |
| 9,310,895 B2* | 4/2016 | Hegde | G06F 3/017 | |
| 9,323,340 B2* | 4/2016 | Pantel | G06F 3/017 | |
| 9,335,924 B2* | 5/2016 | Jobs | G06F 3/0488 | |
| 9,459,792 B2* | 10/2016 | Matas | G06F 3/0485 | |
| 9,507,507 B2* | 11/2016 | Miyazawa | G06F 3/0488 | |
| 2006/0017692 A1* | 1/2006 | Wehrenberg | G06F 1/1616 | |
| | | | 345/156 | |
| 2006/0097991 A1* | 5/2006 | Hotelling | G06F 3/0416 | |
| | | | 345/173 | |
| 2007/0130547 A1* | 6/2007 | Boillot | G06F 3/017 | |
| | | | 715/863 | |
| 2008/0111710 A1* | 5/2008 | Boillot | G06F 3/017 | |
| | | | 341/22 | |
| 2008/0168404 A1* | 7/2008 | Ording | 715/863 | |
| 2008/0211778 A1* | 9/2008 | Ording et al. | 345/173 | |
| 2008/0229255 A1 | 9/2008 | Linjama et al. | | |
| 2009/0070704 A1* | 3/2009 | Ording | 715/784 | |
| 2009/0079700 A1* | 3/2009 | Abernathy | G06F 3/04845 | |
| | | | 345/173 | |
| 2009/0174675 A1* | 7/2009 | Gillespie | G06F 3/0416 | |
| | | | 345/173 | |
| 2009/0309765 A1* | 12/2009 | Wang | G06F 3/017 | |
| | | | 341/20 | |
| 2009/0327963 A1* | 12/2009 | Mouilleseaux | G06F 3/0482 | |
| | | | 715/834 | |
| 2010/0058251 A1* | 3/2010 | Rottler | G06F 3/04845 | |
| | | | 715/863 | |
| 2010/0110031 A1* | 5/2010 | Miyazawa | G06F 3/0488 | |
| | | | 345/173 | |
| 2011/0041100 A1* | 2/2011 | Boillot | G06F 3/011 | |
| | | | 715/863 | |
| 2011/0154266 A1 | 6/2011 | Friend et al. | | |
| 2011/0252346 A1 | 10/2011 | Chaudhri | | |
| 2012/0127207 A1* | 5/2012 | Matas | G06F 3/0485 | |
| | | | 345/676 | |
| 2012/0223892 A1* | 9/2012 | Matsubara | G06F 3/0488 | |
| | | | 345/173 | |
| 2013/0050145 A1* | 2/2013 | Robinson | G06F 3/0425 | |
| | | | 345/174 | |
| 2013/0053007 A1 | 2/2013 | Cosman et al. | | |
| 2013/0061175 A1* | 3/2013 | Matas | G06F 3/0485 | |
| | | | 715/810 | |
| 2013/0201113 A1* | 8/2013 | Hinckley et al. | 345/173 | |
| 2013/0222275 A1* | 8/2013 | Byrd | G06F 3/04883 | |
| | | | 345/173 | |
| 2014/0009499 A1* | 1/2014 | Gardenfors | G09G 5/363 | |
| | | | 345/656 | |
| 2014/0104168 A1* | 4/2014 | Hegde | G06F 3/017 | |
| | | | 345/157 | |
| 2014/0320434 A1* | 10/2014 | Pantel | 345/173 | |
| 2014/0327629 A1* | 11/2014 | Jobs | G06F 3/0488 | |
| | | | 345/173 | |
| 2015/0135108 A1* | 5/2015 | Pope | G06K 9/00006 | |
| | | | 715/767 | |

OTHER PUBLICATIONS

PCT International Search Report and Written Opinion of the International Searching Authority dated Oct. 17, 2014, for International Application No. PCT/US14/39820 filed May 28, 2014, 14 pages.

* cited by examiner

MOTION-BASED GESTURES FOR A COMPUTING DEVICE

BACKGROUND

Recent years have seen drastic increases in the use of portable computing devices, such as smart phones and tablet computers. Today's consumers are utilizing such devices for a wide variety of different purposes, such as to access and search the Internet, purchase products and services, capture and/or send digital images, compose electronic mail (email) messages, make telephone calls and the like. Many of today's portable devices utilize a touch screen to receive input from users of the device. This input often takes the form of gestures made by the user's hand or fingers made while touching the screen of the device. For example, a user may make sliding motions to flip between pages or applications, pinching motions to cause the screen to zoom in or out, or tapping motions to cause the device to perform various other functions. Due to different manufacturers implementing slightly different gestures for their respective devices, the gesture space is becoming crowded in the sense that some motions may be interpreted differently on different devices. For example, some devices may interpret a gesture to invoke one function, while other devices may interpret that same gesture to invoke a completely different function.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches for providing user input to computing devices. In various embodiments, a computing device, such as a phone or tablet computer, can use sensor information obtained from sensors of the computing device to interpret one or more gestures by the user. In particular, the computing device may use information about the movement of the device gathered from an accelerometer or gyroscope in combination with user input data (e.g., touch input, camera input) detected by the device in order to disambiguate between several different types of gestures by a user.

In accordance with an embodiment, the computing device can distinguish between gestures where the device remains stationary (i.e., substantially motionless) while the user's fingers are moving, versus gestures where the user's fingers remain stationary while the computing device is moving. For example, if a user holds the device steady and rotates two fingers on the screen, the computing device may select a first gesture, whereas if the user holds his fingers steady on the screen and rotates the device (causing the same pattern to be registered on the touch screen sensor grid), the computing device may select a second (different) gesture. The first gesture and the second gesture may correspond to different functions on the device and the device can disambiguate between the functions based on the specific movement of the device. For example, the first gesture may correspond to the function of rotating the orientation of the image (e.g., map) being displayed on the screen. The second gesture, on the other hand, may enable the device to switch between an image (e.g., text) being displayed in portrait mode and the image being displayed in landscape mode. For example, in a book reader application or a web browser application, the device may not generally support the function of rotating the screen by using the two finger input rotation. However, the combination of the device being physically rotated and the two fingers remaining stationary in physical contact with the screen may enable the user to rotate the orientation of the screen as desired.

As an alternative example, the first gesture of rotating the fingers while keeping the device stationary may correspond to the function of rotating the orientation of the image on the screen (as before), while the second gesture of rotating the device while keeping fingers stationary may correspond to a locking function that causes the device to be locked in either portrait or landscape mode. Many other examples of such functions and gestures are possible within the scope of the various embodiments. Effectively, the combination of device movement and user input (e.g., touch input) can expand the range of possible gestures that can be utilized with the computing device and enable the computing device to disambiguate between different gestures that may otherwise appear identical to the device based on the user input alone.

In various embodiments, the computing device may include a touch screen display configured to detect touch input from the user. The touch screen display may be a mutual capacitance or self-capacitance touch screen, including a grid of sensors that can be used to detect the user's touch input, determine the locations of the touch input and track the gestures being made by the user (e.g., user's fingers) while physically touching the touch screen. In alternative embodiments, the device may include one or more cameras (e.g., front-facing cameras) configured to capture images of the gesture, where the device may analyze the images to recognize the user gesture without the user physically touching the screen of the device. Additionally, the computing device may include one or more sensor devices, such as a gyroscope or accelerometer, capable of detecting physical movement (e.g., orientation, translation, etc.) of the device. For example, the gyroscope can capture data about the orientation of the device and the accelerometer can capture data about the acceleration of the device. The computing device can analyze the data about the physical movement of the device in combination with the touch input or camera input in order to select between different gestures made by the user. For example, the computing device may disambiguate between gestures made with the user's fingers while the device is held stationary and gestures made by moving the device while the user's fingers are stationary. Depending on the selected gesture, different functions may be invoked on the computing device. For example, one function may cause the device to switch between a portrait mode or landscape mode, while another function may cause an image to be rotated on the screen, as previously described.

As used throughout this disclosure, the term "gesture" means the action being performed by the user. For example, a gesture may be a motion made by the user's hand or fingers. The term "user input" on the other hand is the data that is received or determined by the computing device when the user makes the gesture. For example, the user input may comprise touch screen data detected by the touch screen of the computing device when the user makes a gesture while touching the screen of the device. Similarly, the user input may comprise the image data captured by one or more cameras of the computing device when the user makes a gesture within the field of view of the cameras without touching the screen of the computing device.

Figure 1A:
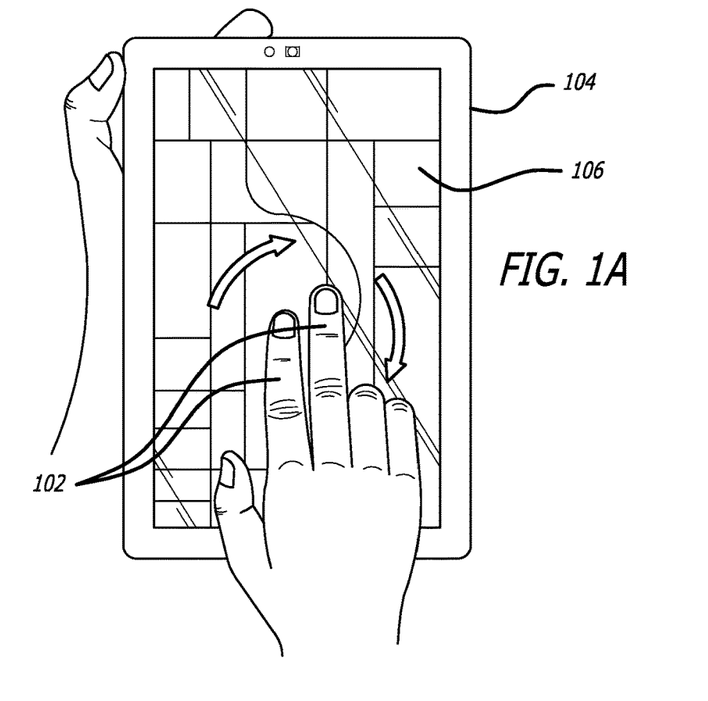
FIGS. 1A and 1B illustrate an example of one gesture that may be selected by the computing device when the computing device remains stationary while the user's fingers are moving, in accordance with various embodiments.
Figure 1B:
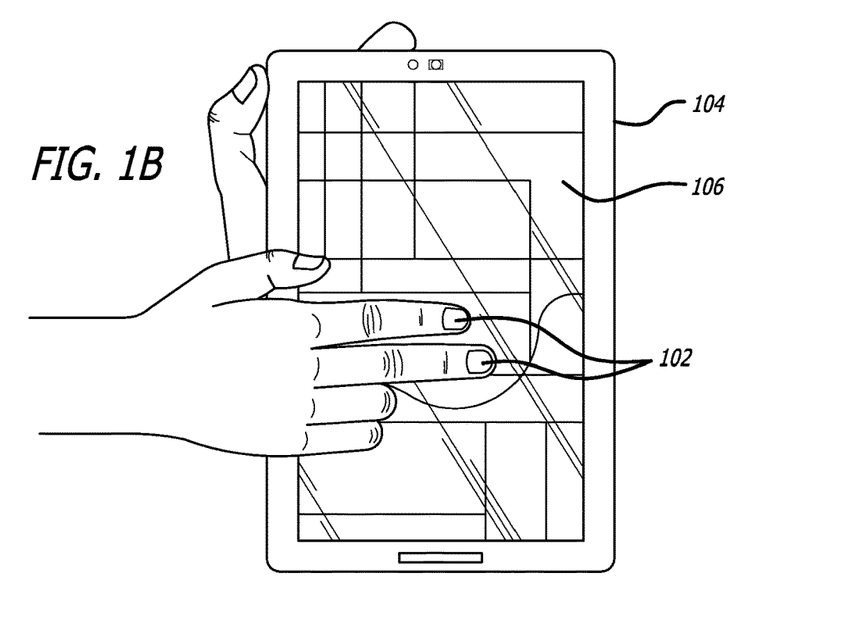

FIGS. 1A and 1B illustrate an example of one gesture that may be selected by the computing device when the computing device remains stationary while the user's fingers are moving. In FIG. 1A, a user is holding a computing device 104, which in this illustration, is shown to be a tablet computer. It will be evident to one of ordinary skill in the art, that any number of other types of computing devices may be utilized in accordance with various embodiments described herein, including but not limited to mobile phones, electronic readers (e-readers), portable media players, personal digital assistants, laptops, wearable computing devices such as watches, glasses, visors or the like. In the illustrated embodiment, the user is making physical contact with the touch screen 106 using two fingers 102, (i.e., the index finger and the middle finger). The user then rotates the two fingers 102 on the screen 106 while maintaining the computing device 104 stationary (e.g., substantially motionless) as illustrated in FIG. 1B.

Because the computing device detects that it remains substantially motionless during the rotation of the finger position, the computing device 104 may select a first gesture. The selection of the first gesture may cause the orientation of a graphical image or other element displayed on the screen 106 to be rotated according to the rotation of the user's fingers 102. In this particular example, the touch screen display 106 is displaying a map application. The rotation of the two fingers 102 while contacting the screen causes the orientation of the map to change on the screen 106 according to the rotation of the fingers. For example, if the fingers rotate clockwise by 90 degrees, the orientation of the map is also rotated clockwise by 90 degrees. In other examples, the orientation of any other image or graphical element on the screen may be rotated in the manner showed in FIGS. 1A and 1B. It is notable, however, that in this particular example, the gesture was selected not solely on the touch input detected by using the touch screen 106, but also taking into account information about the physical movement of the computing device 104.

Figure 2A:
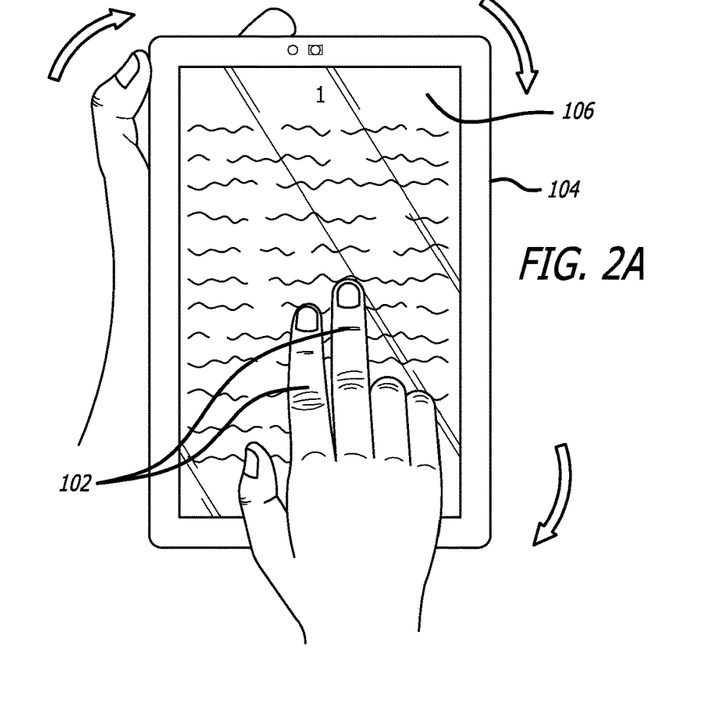
FIGS. 2A and 2B, illustrate an example of another gesture that may be selected by the computing device when the computing device is moving while the user's fingers remain stationary, in accordance with various embodiments.
Figure 2B:
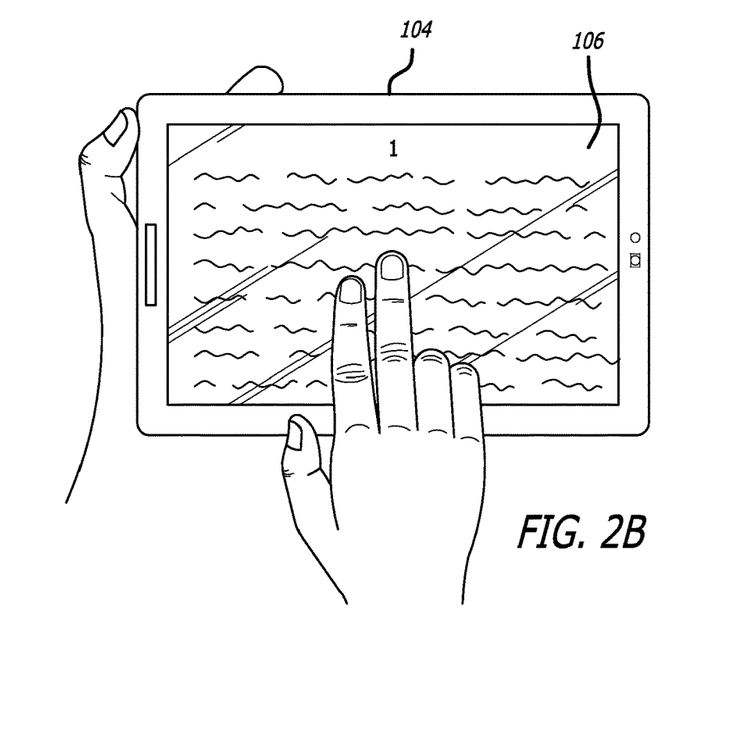

FIGS. 2A and 2B, illustrate an example of another gesture that may be selected by the computing device when the computing device is moving while the user's fingers remain stationary. In FIG. 2A, the user's fingers 102 are making physical contact with the screen, as before. The touch screen display 106 of the computing device 104 is shown as displaying text, such as a page of a book displayed in portrait mode.

In this example, however, rather than the user rotating his/her fingers, the user instead rotates the computing device 104 approximately 90 degrees while keeping the fingers 102 substantially motionless and touching the screen, as shown in FIG. 2B. It should be noted that the touch screen sensors still detect a rotational gesture made by the fingers touching the screen, as before. However, in this case, because the gyroscope/accelerometer also detects physical movement of the computing device, the computing device may analyze the movement and select a different gesture corresponding to the combination of the physical movement and the touch input. In particular, because the gyroscope data indicates that the computing device was physically rotated in a manner to cause the gesture (i.e., approximately 90 degrees) while the fingers remained stationary, the computing device may select a gesture corresponding to the function of rotating the orientation of the text being displayed on the screen to landscape mode. In this example, the reader application may not enable the user to use two finger rotation alone to rotate the orientation of the text but requires the device movement in combination with the two finger rotation to enable the text to be rotated. The device may thus disambiguate between the two types of gestures by utilizing information about the physical movement (i.e. rotation) of the device.

Figure 2C:
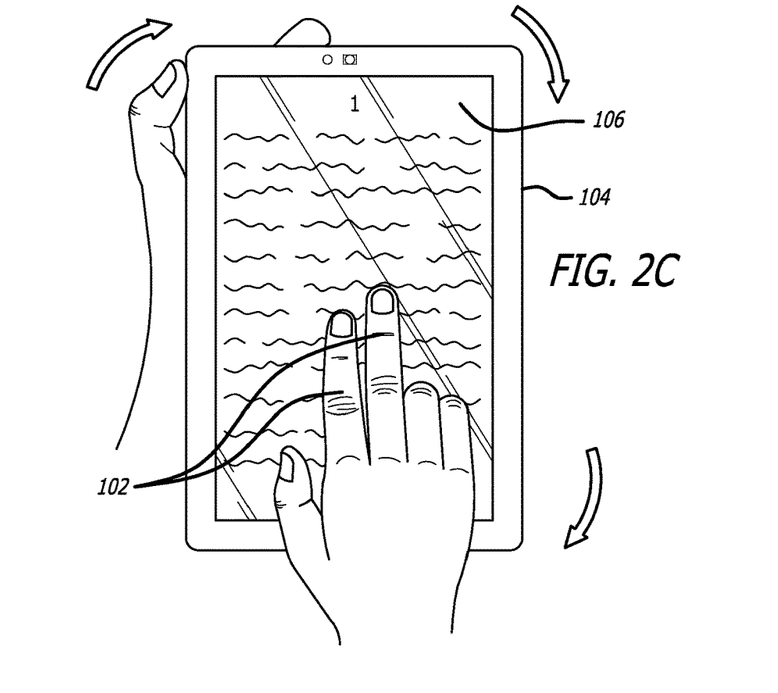
FIGS. 2C and 2D illustrate another example of a different gesture that may be enabled when the device is rotated while the user's fingers remain stationary, in accordance with various embodiments.
Figure 2D:
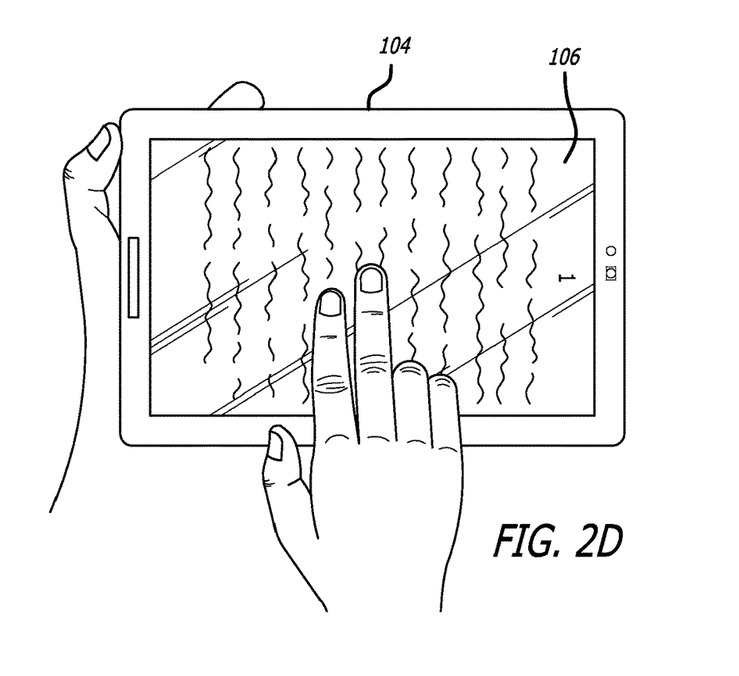

FIGS. 2C and 2D illustrate another example of a different gesture that may be enabled when the device is rotated while the user's fingers remain stationary. In this example, the user keeps his/her fingers stationary while rotating the device approximately 90 degrees, as previously described in FIGS. 2A and 2B. In this example, however, the gesture of keeping the fingers stationary and rotating the device corresponds to the function of locking the device in portrait mode. Thus, as shown in FIG. 2B, the text of the book being displayed on the touch screen display 106 continues to be displayed in portrait mode even though the rotation of the device alone may have otherwise caused the text to rotate to landscape mode. This function may be useful in applications that generally switch between portrait and landscape modes when the device is rotated. For these applications, some users that wish to continue viewing the screen in portrait mode regardless of the actual physical orientation of their device may utilize the gesture illustrated in FIGS. 2C and 2D in order to lock the display screen in portrait mode (or in landscape mode as desired). For example, in cases where the user is laying on their side and trying to read a book, the user may wish to lock the device in portrait mode without having the device switch back and forth between portrait mode and landscape mode. It should be noted, however, that the examples illustrated in FIGS. 2A, 2B, 2C and 2D are shown purely for purposes of illustration and that any other gesture/function may be selected by the computing device depending on the movement and touch input of the user. Moreover, while the examples shown in FIGS. 2A-2D utilize a touch screen to recognize the gesture made by the user, in various alternative embodiments, one or more cameras can be used to recognize gestures made by the user without physically touching the screen of the device, as previously described.

It should further be noted that the terms "stationary" and "steady" as used throughout this disclosure are not limited to the device remaining completely motionless but may include some types of movements of the device (e.g., movements that do not correspond to any predefined gesture). For example, certain movements of the device that fall under a threshold level of movement, such as movements due to a shaky or unsteady hand of the user can be treated as the device remaining stationary. Similarly, certain movements that do not correspond to any predefined gesture may be ignored by the device and treated as though the device remained stationary.

Figure 3A:
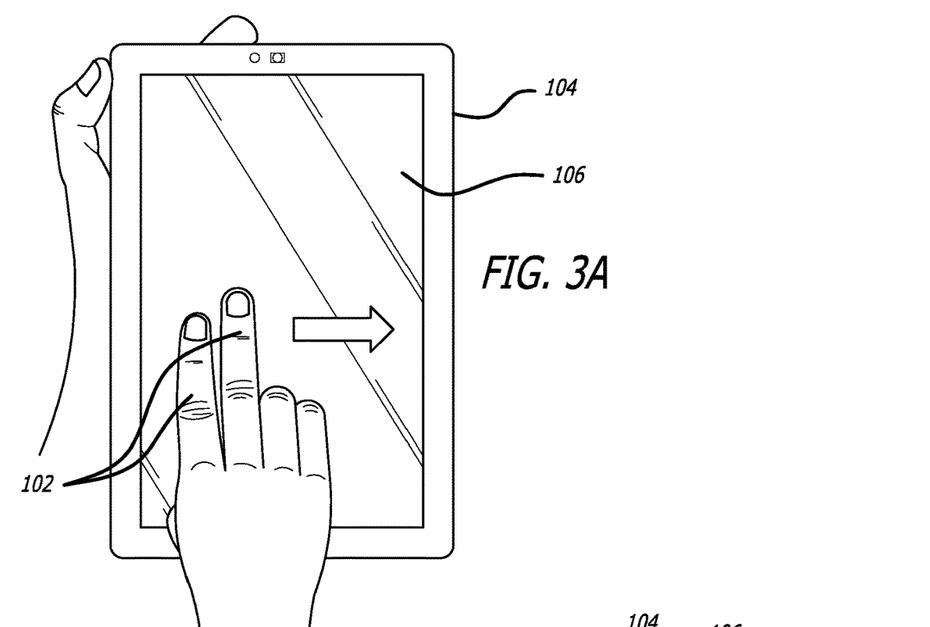
FIGS. 3A and 3B illustrate an example of a computing device disambiguating between several swipe gestures based on the physical movement of the computing device, in accordance with various embodiments.
Figure 3B:
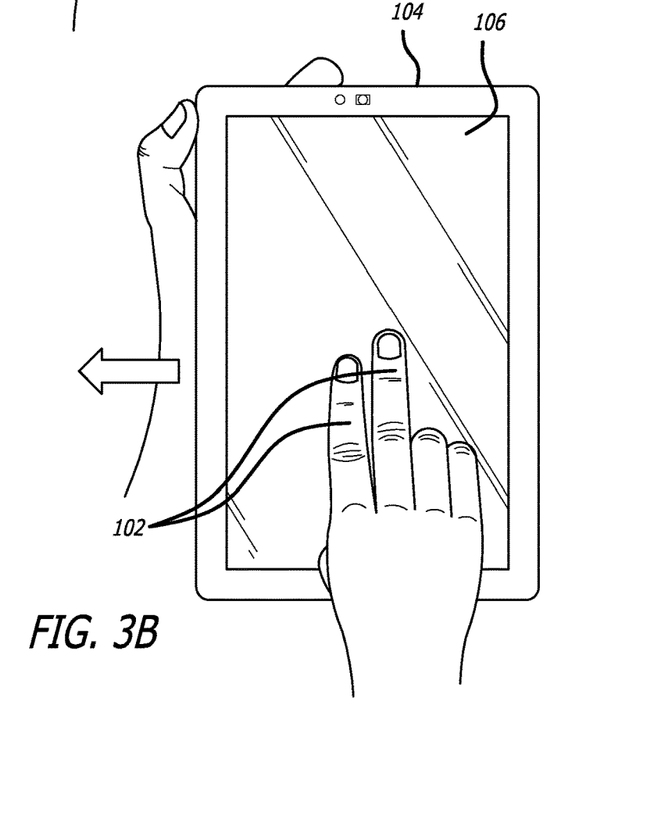

FIGS. 3A and 3B illustrate an example of a computing device disambiguating between several swipe gestures based on the physical movement of the computing device, in accordance with various embodiments. In FIG. 3A, the user is using two fingers 102 (i.e., index finger and middle finger) of his/her right hand to make a swiping motion from left to right across the touch screen display 106 of the computing device 104. Notably, in FIG. 3A, as the user is making the swiping gesture, the computing device 104 is held stationary by the user's left hand. Based on detecting touch input of this type in combination with data indicating that the device is remaining stationary, the computing device 104 may select a first gesture and invoke a function associated with that gesture. For example, the device may invoke a function to "unlock" the screen, or a function to flip a page being displayed on the screen to a different page, depending on the state of the device (e.g., depending on whether the screen is locked or is displaying a page).

In FIG. 3B, on the other hand, the user uses his/her left hand holding the device 104 to move the device from right to left while holding the two fingers 102 substantially motionless and in physical contact with the screen. Notably, the touch input detected by the touch screen 106 may be the same as the input previously shown in FIG. 3A. In FIG. 3B, however, because the computing device 104 also detects (e.g., based on accelerometer data) that the device was moving in a particular direction (e.g., from right to left from the user's perspective) while the input was received, the computing device 104 may select a second gesture (different gesture) and invoke a different function. For example, if the device was executing a book reader application, the user moving the device in this manner may cause the device to reveal a table of contents or another system panel (instead of flipping to the next page of the book as would occur if the device was held stationary). Similarly, in other applications, the motion illustrated in FIG. 3B may reveal the application settings page or other system panel, as opposed to flipping pages. As another example, if the device was displaying a map application, moving the computing device in this manner, may cause the device to switch from the map view to a street view that displays a street view of the location on the map where the user's fingers were originally placed. Many other examples of such functions may be utilized, as defined by the device manufacturer or the application developer.

As can be seen from the illustration of FIGS. 3A and 3B, the same exact touch input detected on the touch screen may correspond to different gestures depending on the particular physical movement of the device that is detected by the sensors of the device to have occurred at the time of the touch input. In particular, the device may analyze the movement and select the gestures depending on whether the movement matches certain predefined criteria associated with the gesture. For example, the user may move the device unintentionally during the making of various gestures, and those unintentional movements may be ignored by the computing device unless the movements actually match a movement pattern defined and stored in memory of the device. This may be helpful to avoid interference due to unintentional shaking of the user's hand and other factors that may occur.

Another example of utilizing the physical movement of the computing device to select between different gestures and/or functions could be when the user uses a single finger to touch a graphical element displayed on the screen and then tilts or tips the device slightly while holding the finger in contact with the screen over the location of the graphical element. In this example, the computing device could analyze the sensor data to detect that the orientation of the device is changing while the touch input is registered on the screen and then select a different gesture than would normally be selected by the user touching the graphical element without moving the device. For example, if there is a plurality of different graphical elements being displayed on the screen, the graphical element being selected by the user's finger may remain on the screen while the other graphical elements may be removed from display when the user tilts the device. As such, the user may effectively "pin" the graphical element (e.g., search result, icon, etc.) on the screen with his/her finger, while "dropping" the other graphical elements off of the screen by tilting or tipping the device.

Another example of utilizing the physical movement of the computing device to select between different gestures and/or functions could be when the user uses a bezel swipe motion to invoke an operating system function rather than the function of the application currently running on the device. For example, some devices provide the ability for the user to use a swiping motion downwards starting from the very top of the screen (e.g., bezel swipe) to display messages or invoke other functionality of the operating system. In some cases, this downward swiping motion may invoke the operating system functionality even while the user has an application open and running on the device. However, it may be that the application may implement a downward gesture in its own way (e.g., to move the display screen in a downward direction, to cause a movement in a game, etc.). In various embodiments, the computing device may distinguish between the application-based swipes and operating system-based swipes according to the movement of the computing device. For example, if the user lifts the computing device to cause the swiping motion while the user's finger remains stationary, the computing device may invoke the operating system function associated with the downward swipe gesture. Conversely, if the user maintains the computing device steady and instead moves the finger downward to make the swipe gesture, the computing device may invoke the function associated with the application-based swipe.

In various embodiments described herein, many other such examples of defining gestures by combining the movement of the device with the user touch input are possible, as will be evident to one of ordinary skill in the art based on the teachings of this disclosure.

Figure 4:
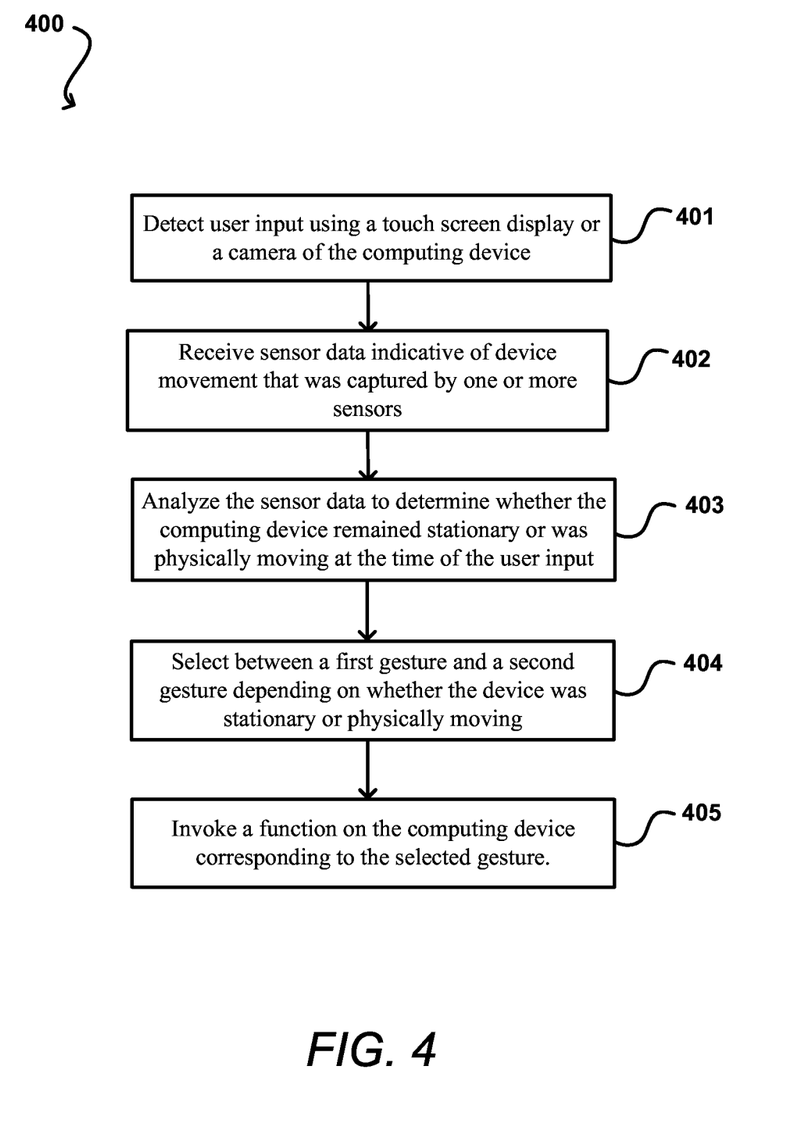
FIG. 4 illustrates a process for selecting between different gestures based at least in part on the movement of the computing device, in accordance with various embodiments.

FIG. 4 illustrates a process 400 for selecting between different gestures based at least in part on the movement of the computing device, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 401, the computing device detects touch input by using a touch screen display or a camera of the computing device. For example, the touch screen display may be a mutual capacitance based display that includes a grid of sensor lines capable of sensing touch input and touch locations of the user. Alternatively, one or more cameras of the device can be used to capture images of the gesture and the device may process the images to recognize the gesture made by the user without receiving any touch input. In operation 402, the computing device may also receive sensor data indicative of device movement. For example, the computing device may include a gyroscope that captures data about the orientation of the device or an accelerometer that captures data about the acceleration of the device.

In operation 403, the computing device may analyze the sensor data to determine whether the computing device remained stationary or was physically moving at the time of the touch input detected on the screen. For example, as previously described, the user may make certain motions by either (a) moving the fingers while keeping the device stationary, or (b) moving the device while keeping the fingers stationary. The computing device may analyze the sensor data about the movement and select between a first gesture and a second gesture depending on whether the device was moving or stationary and depending on the type of movement of the device (if any), as shown in operation 404. In operation 405, the computing device may then invoke a function corresponding to the selected gesture. For example, the device may lock the device in portrait mode or rotate the orientation of the device, as previously described herein.

Figure 5:
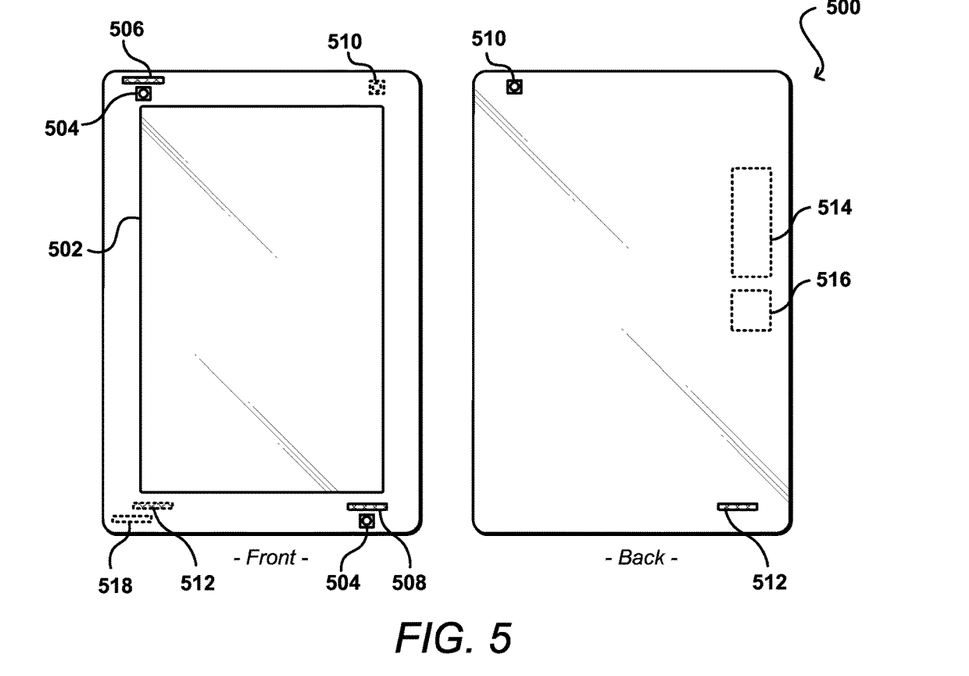
FIG. 5 illustrates front and back views of an example portable computing device that can be used in accordance with various embodiments.

FIG. 5 illustrates front and back views of an example client computing device 500 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others. The client device may have an associated browser width, browser height, as well as various other client-side information associated therewith.

In this example, the portable computing device 500 has a display screen 502 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a touch point, etc. The device can also have touch and/or pressure sensitive material 510 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 504 on the "front" of the device and one image capture element 510 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 506 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 500 in this example also includes at least one motion or position determining element operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 514, such as may include at least one wired or wireless component operable to communicate with one or more portable computing devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
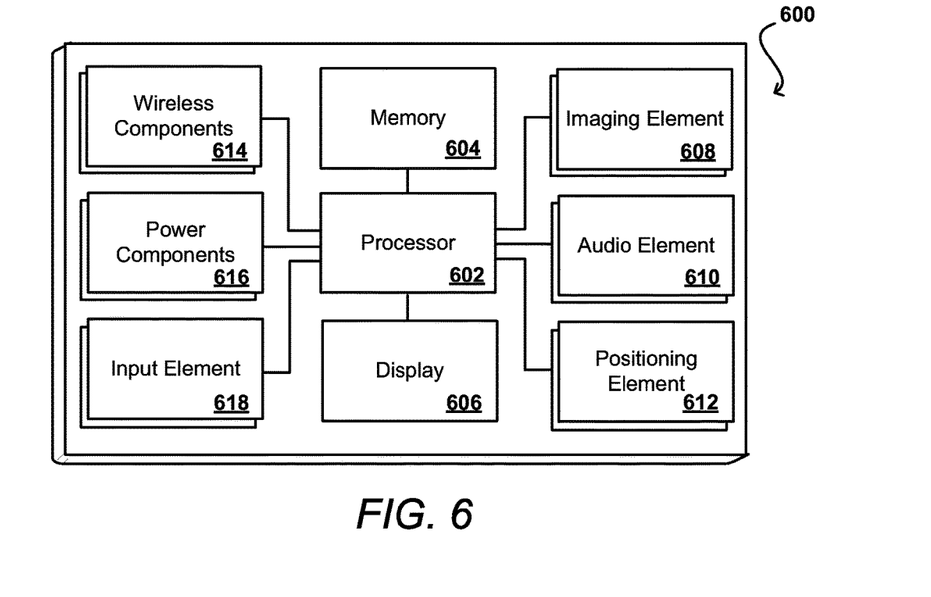
FIG. 6 illustrates an example set of basic components of a portable computing device, such as the device described with respect to FIG. 5.

In order to provide functionality such as that described with respect to FIG. 5, FIG. 6 illustrates an example set of basic components of a portable computing device 600, such as the device 500 described with respect to FIG. 5. In this example, the device includes at least one processor 602 for executing instructions that can be stored in at least one memory device or element 604. As would be apparent to one of ordinary skill in the art, the device can include many types of memory, data storage or computer-readable storage media, such as a first data storage for program instructions for execution by the processor 602, the same or separate storage can be used for images or data, a removable storage memory can be available for sharing information with other devices, etc.

The device typically will include some type of display element 606, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 608, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device.

The device, in many embodiments, will include at least one audio element 710, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 612 that provides information such as a position, direction, motion, or orientation of the device. This positioning element 612 can include, for example, accelerometers, inertial sensors, electronic gyroscopes, electronic compasses, and GPS elements.

The device can include at least one additional input device 618 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 614 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 616 known in the art for providing power to a portable computing device, which can include capacitive charging elements for use with a power pad or similar device as discussed elsewhere herein. The example device also can include at least one touch and/or pressure sensitive element 618, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

Figure 7:
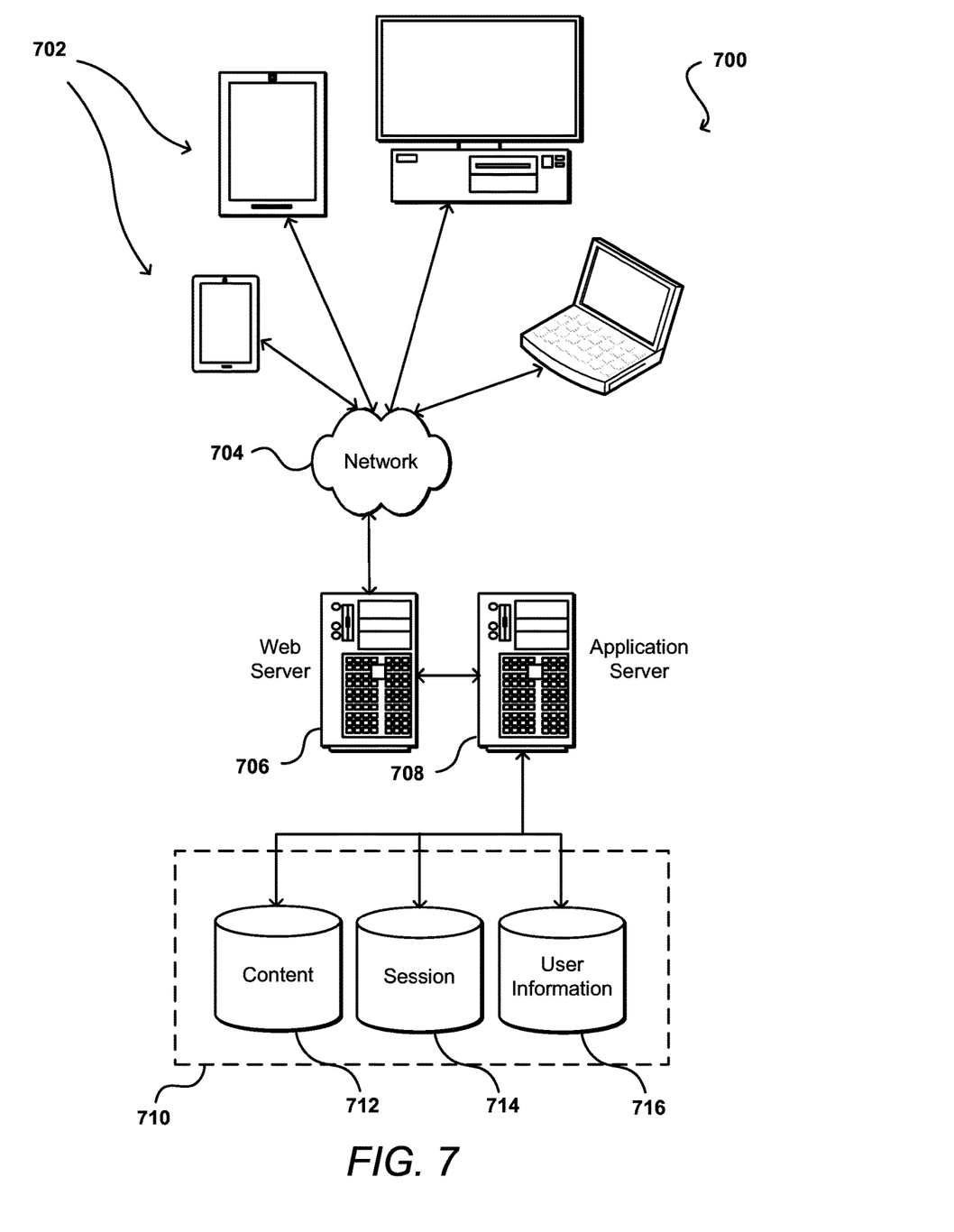
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   one or more sensors configured to capture sensor data, the sensor data indicating a physical movement of the computing device performed by at least a first hand of a user;
   a touch screen display, generating touch location data representing touch locations on the touch screen display by at least a first finger and a second finger of a second hand of the user;
   a processor for executing instructions stored in a memory which, when executed by the processor, cause the computing device to:
      determine, during a first period, using the touch location data, first touch location data associated with the first finger contacting the touch screen display;
      determine, during the first period, using the touch location data, second touch location data associated with the second finger contacting the touch screen display;
      determine, during a second period after the first period, using the touch location data, third touch location data associated with the first finger contacting the touch screen display;
      determine, during the second period, using the touch location data, fourth touch location data associated with the second finger contacting the touch screen display;
      determine, using the sensor data, information about the physical movement of the computing device between the first period and the second period;
      determine, based at least on the first touch location data and the third touch location data being different, that a first position of the first finger on the touch screen display during the first period is different than a third position of the first finger on the touch screen display during the second period;
      determine, based at least on the second touch location data and the fourth touch location data being different, that a second position of the second finger on the touch screen display during the first period is different than a fourth position of the second finger on the touch screen display during the second period;
      determine a first gesture during a third period based at least on the physical movement of the computing device between the first period and the second period, the first position of the first finger on the touch screen display during the first period being different than the third position of the first finger on the touch screen display during the second period, and the second position of the second finger on the touch screen display during the first period being different than the fourth position of the second finger on the touch screen display during the second period, wherein the first gesture corresponds to the second hand remaining steady while the computing device is rotated between the first period and the second period;
      select the first gesture;
      invoke a first function of the computing device, the first function corresponding to the first gesture, the first function including switching the touch screen display from a landscape display mode to a portrait display mode and then maintaining the touch screen display in the portrait display mode, or switching the touch screen display from a portrait display mode to a landscape display mode and then maintaining the touch screen display in the landscape display mode;
      determine a second gesture during a fourth period, the second gesture different than the first gesture; and
      invoke a second function of the computing device, the second function corresponding to the second gesture, the second function including maintaining the touch screen display in either the portrait display mode or the landscape display mode while the computing device is rotated.

2. The computing device of claim 1, wherein the one or more sensors further comprise at least one of:
   an accelerometer configured to measure an acceleration of the computing device; or
   a gyroscope configured to measure an orientation of the computing device.

3. The computing device of claim 1, wherein the memory further includes instructions that, when executed by the processor, further cause the computing device to:
   determine the second gesture, wherein the second gesture corresponds to at least the computing device remaining stationary between a fifth period and a sixth period; and
   select the second gesture.

4. The computing device of claim 3, wherein the memory further includes instructions that, when executed by the processor, further cause the computing device to determine that the touch location data between the fifth period and the sixth period represents the first and second fingers physically moving while the computing device remains stationary.

5. A computer implemented method, comprising:
   under the control of a computing device configured with executable instructions,
      receiving user input data generated by a touch screen, the user input data representing at least:
         first touch location data of a first finger of a second hand of a user on the touch screen during a first period;
         second touch location data of a second finger of the second hand on the touch screen during the first period;
         third touch location data of the first finger of the second hand on the touch screen during a second period, the second period after the first period; and
         fourth touch location data of the second finger of the second hand on the touch screen during the second period;
      processing data captured by one or more sensors of the computing device to determine a rotation of the computing device performed by at least a first hand of the user between the first period and the second period;

determining, based at least in part on the first touch location data and the third touch location data being different, that a first position of the first finger on the touch screen during the first period is different than a third position of the first finger on the touch screen during the second period;

determining, based at least in part on the second touch location data and the fourth touch location data being different, that a second position of the second finger on the touch screen during the first period is different than a fourth position of the second finger on the touch screen during the second period;

determining a first gesture during a third period based at least on the rotation of the computing device between the first period and the second period, the first position of the first finger on the touch screen during the first period being different than the third position of the first finger on the touch screen during the second period, and the second position of the second finger on the touch screen during the first period being different than the fourth position of the second finger on the touch screen during the second period, wherein the first gesture corresponds to the second hand remaining steady while the computing device is rotated between the first period and the second period;

invoking a first function of the computing device, the first function corresponding to the first gesture, the first function comprising at least switching the touch screen from a portrait display mode to a landscape display mode and then maintaining the touch screen in the landscape display mode;

determining a second gesture during a fourth period, the second gesture different than the first gesture; and invoking a second function of the computing device, the second function corresponding to the second gesture, the second function including maintaining the touch screen in either the portrait display mode or the landscape display mode while the computing device is rotated.

6. The computer implemented method of claim 5, wherein the first gesture corresponds to the first finger and the second finger rotating relative to the computing device while making physical contact with the touch screen of the computing device.

7. The computer implemented method of claim 5, wherein the first function causes rotation of an orientation of a graphical image displayed on the touch screen.

8. The computer implemented method of claim 5, wherein the one or more sensors of the computing device further comprise at least one of:

an accelerometer configured to measure an acceleration of the computing device; or a gyroscope configured to measure an orientation of the computing device.

9. A non-transitory computer readable storage medium storing one or more sequences of instructions that, when executed by one or more processors, cause a computing device to:

receive user input data generated by a touch screen, the user input data representing at least:

first touch location data of a first finger of a second hand of a user relative to the touch screen during a first period;

second touch location data of a second finger of the second hand relative to the touch screen during the first period;

third touch location data of the first finger of the second hand relative to the touch screen during a second period; and fourth touch location data of the second finger of the second hand relative to the touch screen during the second period;

process data captured by one or more sensors of the computing device to determine a rotation of the computing device performed by at least a first hand of the user between the first period and the second period;

determine, based at least in part on the first touch location data and the third touch location data being different, that a first position of the first finger on the touch screen during the first period is different than a third location of the first finger on the touch screen during the second period;

determine, based at least in part on the second touch location data and the fourth touch location data being different, that a second position of the second finger on the touch screen during the first period is different than a fourth location of the second finger on the touch screen during the second period;

determine a first gesture during a third period based at least on the rotation of the computing device between the first period and the second period, the first position of the first finger on the touch screen during the first period being different than the third location of the first finger on the touch screen during the second period, and the second position of the second finger on the touch screen during the first period being different than the fourth location of the second finger on the touch screen during the second period, wherein the first gesture corresponds to the second hand remaining steady while the computing device is rotated between the first period and the second period;

invoke a first function of the computing device, the first function corresponding to the first gesture, the first function comprising at least switching the touch screen from a portrait display mode to a landscape display mode and then maintaining the touch screen in the landscape display mode;

determine a second gesture during a fourth period, the second gesture different than the first gesture; and invoke a second function of the computing device, the second function corresponding to the second gesture, the second function including maintaining the touch screen in either the portrait display mode or the landscape display mode while the computing device is rotated.

10. The non-transitory computer readable storage medium of claim 9, wherein the first gesture corresponds to the first finger and the second finger rotating relative to the computing device while making physical contact with the touch screen of the computing device.

11. The non-transitory computer readable storage medium of claim 9, wherein the first function causes rotation of an orientation of a graphical image displayed on the touch screen.

12. The non-transitory computer readable storage medium of claim 9, wherein the one or more sensors of the computing device further comprise at least one of:

an accelerometer configured to measure an acceleration of the computing device; or a gyroscope configured to measure an orientation of the computing device.

* * * * *